United States Patent [19]

Stanuch et al.

[11] Patent Number: 5,207,496
[45] Date of Patent: May 4, 1993

[54] WARNING LIGHT WITH ACCESSORY MIRROR

[75] Inventors: Edward S. Stanuch; Edward J. Stanuch, both of Oak Forest, Ill.

[73] Assignee: Federal Signal Corporation, University Park, Ill.

[21] Appl. No.: 592,670

[22] Filed: Oct. 4, 1990

[51] Int. Cl.$^5$ ............................................. B60Q 1/52
[52] U.S. Cl. ....................................... 362/35; 362/74; 362/297; 362/298; 340/471
[58] Field of Search ................... 362/35, 61, 74, 80, 362/297, 298, 346; 340/471, 472, 473; 74/42, 416, 425, 426

[56] References Cited

U.S. PATENT DOCUMENTS

| | | | |
|---|---|---|---|
| 3,351,904 | 11/1967 | Norok | 362/35 |
| 4,054,791 | 10/1977 | DuShane | 362/35 |
| 4,205,366 | 5/1980 | Bleiwas et al. | 362/35 |
| 4,377,802 | 3/1983 | Ferenc | 340/472 |
| 4,595,904 | 6/1986 | Gosswiller et al. | 362/35 |
| 4,626,966 | 12/1986 | Bleiwas et al. | 362/35 |
| 4,701,743 | 10/1987 | Pearlman et al. | 362/35 |
| 4,745,530 | 5/1988 | Farrell, Jr. et al. | 362/80 |
| 4,931,768 | 6/1990 | Jincks et al. | |

OTHER PUBLICATIONS

Federal Signal Corporation Service Parts Catalog, 1985-1986 edition, p. 118.
"Dash Laser TM M" brochure, Apr. 1988.
"Dash Laser TM Portable Warning Light" brochure, Apr. 1988.
"Dash Laser TM 5-Flash" brochure, Apr. 1988.
"1175 Hotshot" brochure, no date.
"Model L-11H Volunteer Light" brochure, no date.
"Model 610 Pathfinder TM" brochure, no date.
"Responder TM N" brochure, Oct. 1989.
"Reflect-A-Beam TM" brochure, Oct. 1989.

Primary Examiner—Richard R. Cole
Attorney, Agent, or Firm—Leydig, Voit & Mayer

[57] ABSTRACT

A mirror assembly for use with a warning light which has a reflector that is capable of rotating a beam of light emanating from a lamp located at its focal point. The mirror assembly comprises a first set of first, second and third mirrors mounted to the attachment for reflecting the intercepted light in a predetermined direction, where the reflections occur first from the first mirror, then from the second mirror and finally from the third mirror; and a port between the first and third mirrors for passing light to the second mirror such that the reflected beam from the second mirror is further from the focal point than the reflected beams from the first and third mirrors. A warning light is also provided which may be used either alone or in combination with the aforesaid mirror assembly. One embodiment of this light comprises a reflector and lamp mounted in a base wherein the reflector rotates about a focal point of the reflector; a manually operable mechanism mounted to the base section and having variable positions; and means responsive to the mechanism for rotating the reflector at different speeds when the mechanism is in different positions. The design of the aforesaid light also includes a provision for either directly manufacturing a warning light, or modifying an existing warning light, such that the beam of light is capable of rotating 360° oscillating about the warning light. A printed circuit board may also be included in the warning light.

26 Claims, 5 Drawing Sheets

WARNING LIGHT WITH ACCESSORY MIRROR

FIELD OF THE INVENTION

The present invention relates to lights and related mirror assemblies used by police, fire departments, airlines and the military to warn persons of dangerous conditions and, more specifically, to warning lights and assemblies which are removably mounted upon the dashboard of a vehicle such that they are readily visible to persons approaching the vehicle.

BACKGROUND OF THE INVENTION

Various types of warning lights, as well as accessory mirrors, have been used for years by many governmental and non-governmental agencies, including police and fire departments and towing services. Such lights and related assemblies can be mounted on the roofs, in rear windows, or dashboards of vehicles as a means of alerting persons approaching the vehicles to the existence of hazardous conditions.

Although warning lights have often been used alone, it is well known that their effectiveness for alerting persons is enhanced by use of accessory mirrors. Each of the mirrors reflects light from the warning light's lamp in a single predetermined direction, thus having the effect of providing multiple flash patterns to an observer. It is known that increasing the number of flashes produced by the light increases the ability of the warning light to draw attention to itself, thereby increasing the light's overall effectiveness.

Several light/mirror arrangements have been used in commercially available systems to increase the number of flashes seen by observers. One such arrangement uses a lamp having a parabolic reflector which rotates through 360°, giving the appearance that the lamp itself is rotating. Four planar mirrors are positioned lateral to the lamp in a generally semi-circular configuration such that light from the lamp is reflected by all four mirrors sequentially. The four mirrors are further arranged such that light reflected by each mirror is directed along predetermined parallel light paths (i.e., toward an observer). Upon operation, this device provides a series of five flashes. This increases the effectiveness of the warning light over a single flashing light.

Of course, the effectiveness of the warning light further increases as a greater number of flashes are produced by the apparatus. However, problems arise when one attempts to obtain additional flashes by merely extending the methodology used in the heretofore described arrangement. Although placement of additional mirrors in the same semi-circular configuration around the lamp would seem to offer an easy solution, practical difficulties arise when using this approach. For one, the width of the mirrors cannot be so limited as to cause the flashes to lose their individuality, thereby becoming, in a sense, "blended" together. In such a case, distinguishing individual flashes becomes difficult for an observer since all of the flashes appear to be emanating from the same source, thereby defeating the effectiveness associated with the concept of multiple mirror systems. Moreover, use of additional mirrors forces the forwardmost mirrors to be oriented almost parallel to the predetermined light path, substantially reducing their effectiveness.

Presently known methods would resolve such problems by increasing the radius of the semi-circle such that additional mirrors can be accommodated. This, however, has the undesirable effect of increasing the overall width and depth of the mirror assembly. Such a size increase would render the assembly bulky, making it difficult to handle and store. Further, if used on the dashboard of a vehicle, it would protrude excessively into the passenger compartment of a vehicle, possibly impairing the vision of the vehicle's driver.

A further method for increasing a warning light's effectiveness is to adjust the rate of flashing of a warning light such that the light's effectiveness is maximized. This is best explained by reference to the light's use in a vehicle. When a warning light is mounted on a vehicle which is traveling toward an observer, a certain number of flashes must be generated by the light in order to provide an adequate level of warning to the observer. Translating this principle as regarding a vehicle which is moving at a relatively fast rate of speed, an increased flash rate is required to provide an observer with an adequate number of warning flashes to allow recognition of the oncoming vehicle. Conversely, if the vehicle is stationary or moving at a relatively lower rate of speed, a slower flash rate can be used. Further, use of such slower flash rate when the vehicle is travelling relatively slowly or when it is stationary allows the light to remain in contact with an observer's eye for a longer period of time, thus increasing the effectiveness of the warning light. Thus, lights having only a single flash rate are not desirable for use in situations where a vehicle will be both parked and moving at various rates of speed while the light is operating.

Also affecting the effectiveness of a warning light are the colors of light reaching an observer. Generally, the more colors displayed by a light, the greater its effectiveness.

An additional consideration regarding the operation and effectiveness of a warning light is that it is sometimes desirable to have lamps in warning lights which appear to rotate 360°, while at other times lamps which appear to oscillate back and forth are more desirable. Presently available warning lights are generally manufactured in two versions: a first type which rotates the light from the lamp 360° by use of a rotating reflector and a second type which rotates the light from the lamp in an oscillating motion by use of an oscillating reflector. Generally, there are no known mechanical method or warning light designs which would allow one type of light to be modified easily and inexpensively to produce a light of the other type.

With regard to the construction of warning lights, present methods of assembly are quite labor and material intensive. Many methods involve the assembly of the various parts using screws and other small fastening devices. The use of such fasteners not only serves to increase the cost of the light, but also increases the labor cost component. For example, upon fastening each component to another, an assembly worker must first locate the proper fastener, properly position the fastener, and then, in the case of a screw, twist the fastener into place. For a warning light that has several components, this can become very time-consuming as well as inefficient.

SUMMARY OF THE INVENTION

It is therefore a primary object of the present invention to provide a warning light assembly which, upon operation, has a greater effectiveness when compared to those assemblies which are presently available.

A related object is to provide a warning light assembly which has a high degree of effectiveness while remaining relatively compact in size.

Yet another object of the present invention is to provide a warning light which is maximally effective whether a vehicle is moving at a low or high rate of speed or is stationary.

Another object is to provide a warning light which can be easily modified after manufacture according to the operators desired type of light rotation.

A further object is to provide a design which will allow a pair of warning lights to utilize many of the same parts so that a light can be economically produced in either of the two versions.

A related object is to provide a warning light design which allows the light to be more efficiently manufactured from a labor perspective as compared to previously analyzed methods.

In accordance with the aforesaid objects, the present invention provides a mirror assembly for use with a warning light which has a reflector that is rotatable about a focal point of the reflector for rotating a beam of light emanating from a lamp located at the focal point. The mirror assembly comprises a surface for intercepting the beam of light over a portion of a full rotation; a first set of first, second and third mirrors mounted to the attachment for reflecting the intercepted light in a predetermined direction, where each of the mirrors is positioned to reflect light at a different angle in the rotation of the beam such that the reflections occur first from the first mirror, then from the second mirror and finally from the third mirror; and a port between the first and third mirrors for passing light to the second mirror such that the reflected beam from the second mirror is further from the focal point than the reflected beams from the first and third mirrors. A second set of first, second and third mirrors may also be mounted onto the mirror assembly opposite to the first set of mirrors.

The present invention further provides warning lights which may be used either alone or in combination with the aforesaid mirror assembly.

One embodiment of these lights comprises a base section including a magnet for mounting the warning light assembly to a metallic surface; a reflector mounted in the base section for rotation about a focal point of the reflector; a lamp mounted in the base section at the focal point; a dome attached to the base section for transmitting a beam of light formed by the reflector from light emanating from the lamp; a manually operable mechanism mounted to the base section and having variable positions; and means responsive to the mechanism for rotating the reflector at different speeds when the mechanism is in different positions.

A further embodiment of the warning lights of the present invention provides an oscillating beam of light. This light comprises a base section including means for securing the warning light to a surface; a reflector mounted in the base section to a gear for rotation about an axis containing a focal point of the reflector; a lamp mounted in the base section and at the focal point; a motor mounted in the base section for continuous rotation in a single direction and directly driving a worm gear comprising a worm and worm wheel so as to impart the continuous rotation to the worm wheel in a single direction; and means connecting the worm wheel to the gear supporting the reflector for translating the continuous rotation of the worm wheel to an oscillating movement for the gear and the reflector.

The design of the aforesaid warning light also includes a provision for either directly manufacturing a warning light, or modifying an existing oscillating warning light, such that the beam of light is capable of rotating 360° about the warning light. Further, the same may be accomplished regarding the direct manufacture of a warning light, or a modification of an existing 360° rotating light, such that the beam of light oscillates about the warning light.

DESCRIPTION OF THE DRAWINGS

The invention may be best understood with reference to the accompanying drawings wherein:

FIG. 3b is a perspective view of the mirror assembly of FIG. 3a;

DETAILED DESCRIPTION OF THE PREFERRED EMBODIMENTS

While the invention will be described in connection with particular preferred embodiments, it will be understood that it is not intended to limit the invention to those particular embodiments. On the contrary, it is intended to cover all alternatives, modifications and equivalents as may be included within the spirit and scope of the invention as defined by the appended claims.

Figure 1:
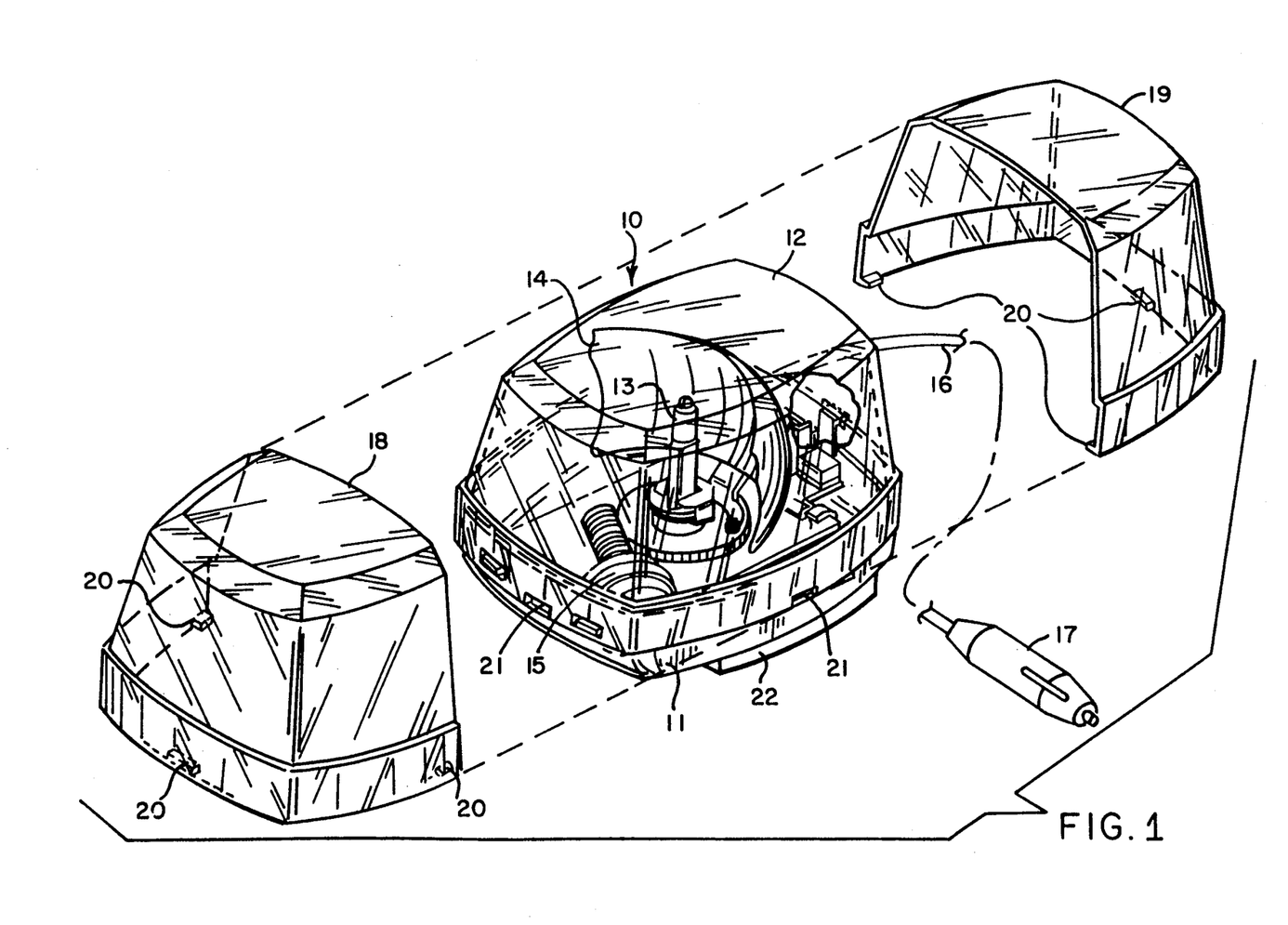
FIG. 1 is a perspective view of a warning light which illustrates the attachment of colored filters onto the light.

Turning now to the drawings and referring initially to FIG. 1, there is shown generally a warning light 10 in accordance with the present invention. The light 10 has a base 11 and a dome 12 which house the components of the light. The components comprise generally a lamp 13, a rotatable reflector 14 which rotates about a focal point of the reflector, and a means 15 for rotating the reflector. Upon operation, such an arrangement results in a portion of the light from the lamp being reflected by the reflector. This reflected light is collimated into a beam that rotates as the reflector rotates. To a stationary observer, the light would appear to be rotating 360°, an effect which has been determined to be particularly effective in drawing the attention of nearby observers. A power cord 16 provides electric power to the light and terminates with a plug 17 of conventional design that may be inserted into a cigarette lighter of a vehicle.

The light 10 further includes a provision for the mounting of filters 18, 19 thereon. In the illustrated embodiment, two filters are used, each covering one-half of the dome, although they can be easily designed to cover any portion of the dome desired. In order to secure the filters to the dome, a tongue and slot system is utilized. More specifically, a series of tongues 20 are located on the periphery of the inside of the filter. Corresponding slots 21 are located in the base 11 of the warning light 10, these slots being located and sized to allow engagement and disengagement of the tongues 20. This system allows the filters to be easily positioned over the dome 12 as well as removed according to the requirements of the warning light operator.

Although the dome 12 is usually at least partially transparent, e.g., clear, it may also consist of a colored filter. In such a case, and if it was desired to obtain two colors of light from the warning light, it would only be necessary to use a single additional filter over a portion of the dome 12. The base 11, dome 12 and filters 18, 19 may be manufactured from any suitable material, advantageously a polycarbonate (Mobay Chemical Co.). The dome 12 and filters 18, 19 are preferably comprised of a lens-grade polycarbonate (Mobay Chemical Co.).

Figure 2:
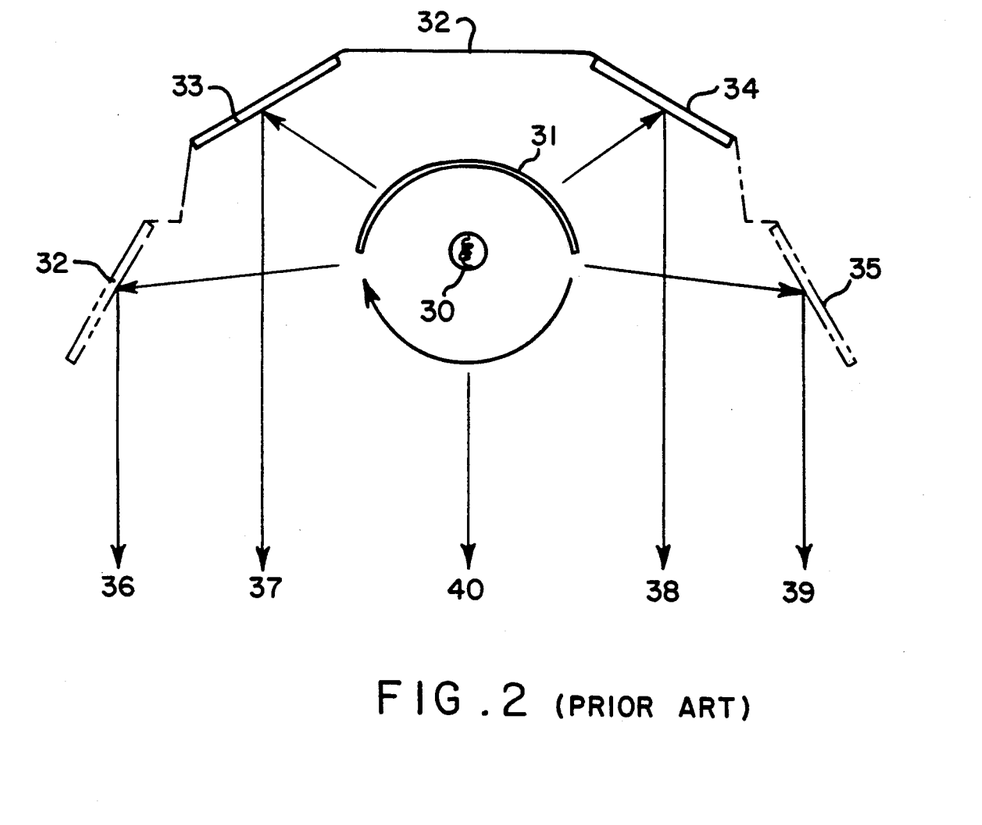
FIG. 2 illustrates a prior art mirror assembly.

A further component that is typically included on transportable warning lights of the type illustrated is a means for mounting the light onto a surface, such as a dashboard or roof of a vehicle. While these mounting means may comprise adhesives, screws or other fasteners, it is preferable to use a mechanism that allows easy mounting and dismounting of the light, such as the magnet 22 in the 0 illustrated embodiment located on the underside of the base As mentioned previously, the effectiveness of transportable warning light is enhanced by mounting to the light an attachment that results in multiple flashes being seen by an observer for every rotation of the beam. FIG. 2 illustrates a schematic top view of a prior art attachment in combination with a light source 30 and rotating reflector 31. In this configuration, five flashes may be seen by an observer. The attachment generally comprises a mounting surface 32 which has four mirrors 32, 33, 34, 35 mounted thereon. The operation of such a warning light-assembly combination will be readily appreciated for the following description.

Starting from the position indicated in FIG. 2, the clockwise rotating reflector 31 first directs a beam of light 36 onto mirror 32 which is positioned to reflect the beam 36 in a predetermined direction, thereby producing a "flash" of light. As the reflector continues its rotation, it directs light onto mirrors 33, 34 and 35, sequentially, producing reflected beams 37, 38 and 39, respectively. All of these reflected beams, by virtue of the mirror placements, are directed in parallel paths in a predetermined direction. After the light is reflected by the fourth mirror 35, the light is reflected parallel to the predetermined direction 40 by the reflector 3 such that a fifth flash is produced. After such fifth flash, the reflector 31 continues its rotation, repeating the reflective pattern described previously, until the supply of power to the warning light is terminated.

Figure 3A:
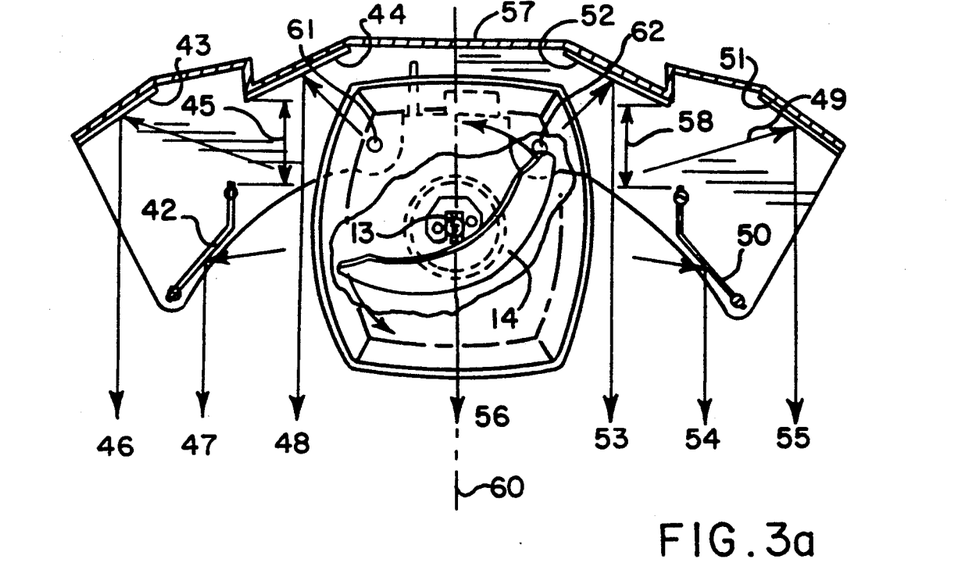
FIG. 3a is a top view of a warning light which is attached to a preferred embodiment of the mirror assembly of the present invention, this figure further illustrating the paths taken by light which is reflected by the individual mirrors of the mirror assembly.

Turning now to one aspect of the present invention, FIG. 3a illustrates a top view of a preferred embodiment which comprises the warning light of FIG. 1 in combination with a mirror assembly. Any suitable warning light may be used which is capable of providing a beam of light which rotates outwardly from the center of the light. As can be readily appreciated with reference to FIG. 3a, the warning light of FIG. 1 comprises a lamp 13 and a reflector 14 which is rotatable about a focal point of the reflector. The reflector 14 may be comprised of glass, a reflective-coated plastic, or any other suitable material. Advantageously, the reflector is parabolic in shape.

For the purpose of the following description only, the reflector 14 will be described as rotating counterclockwise. The same ultimate effect, which will be described in the following paragraphs, will be obtained regardless of the direction of rotation of the reflector 14.

The warning light may be mounted onto the mirror assembly by any suitable means such as, for example, a snap-fit tongue and slot system or a more conventional system which uses thread-forming screws. In such a conventional system, the screws initially pass through two mounts 61, 62 in the mirror assembly and engage two bosses 63, 64 located in the base 11 of the warning light 10. These bosses 63, 64 are more apparent with reference to FIG. 4a.

Upon operation, the warning light-mirror assembly combination results in an observer seeing seven flashes of light, this combination therefore having a greater effectiveness as compared to five flash devices such as shown in FIG. 2. In developing the present mirror assembly, a novel approach was taken with the design of the mirror assembly. Instead of placing a third mirror in the same general semi-circular location as in known devices, first, second and third mirrors 42, 43, and 44, respectively, are mounted onto the attachment 49 as illustrated in FIG. 3a. While each of these mirrors is positioned on the attachment so as to reflect a beam of light from the reflector 14 in a predetermined direction, there is a port 45 located between the first and third mirrors 42 and 44. This port 45 allows a beam of light from the reflector 14 to pass between the first and third mirrors 42 and 44 to the second mirror 43. In such a configuration, the beam 46 reflected by the second mirror 43 is further from the focal point of the reflector 14 than the reflected beams 47, 48 from the first 42 and third 44 mirrors, respectively.

The previously described design is preferably expanded such that a second set of first, second and third mirrors 50, 51 and 52, respectively, is mounted onto the attachment 49 on the other side of a plane 60 which passes through the focal point of reflector 14. In such a configuration, the pairs of second mirrors 43, 51 and third mirrors 44, 52 are mounted onto a vertical surface 57 of the attachment 49. These mirrors are positioned such that they also direct light from the reflector 14 in a direction which is parallel to the plane 60, i.e., the predetermined direction.

As may be envisioned with reference to FIG. 3a, a warning light-mirror assembly combination as previously described would, upon operation, direct light for purposes of explanation, initially upon mirror 42, then sequentially upon mirrors 43, 44, 52, 51 and 50. From such reflections, reflected beams 47, 46, 48, 53, 55 and 54 are directed in a path which is parallel to the predetermined direction. Finally, a seventh beam 56 is reflected in the predetermined direction by the reflector 14 itself.

Figure 3B:
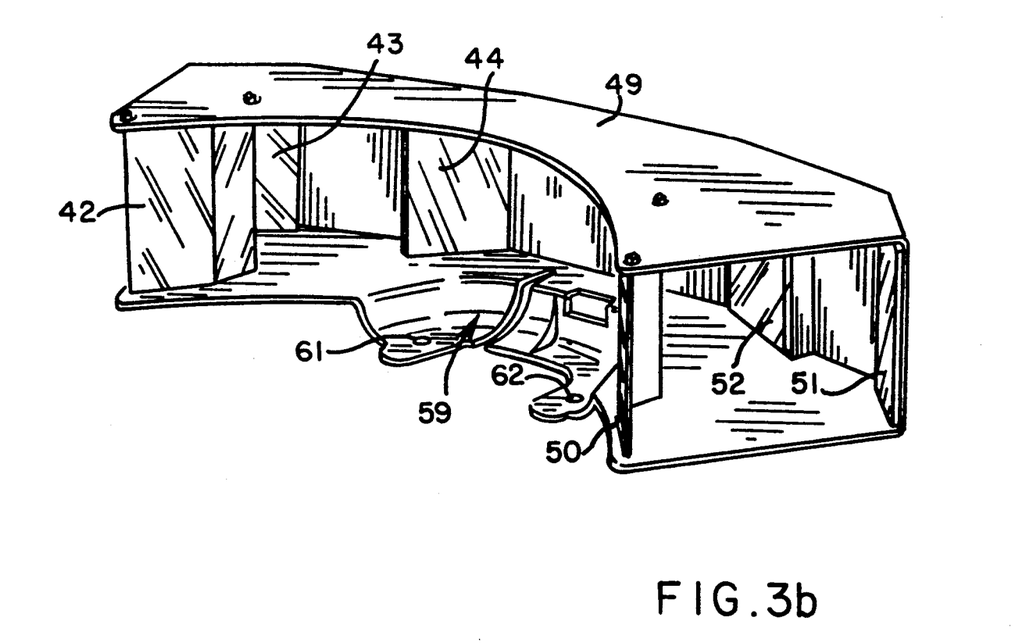

FIG. 3b is a perspective view of the preferred mirror assembly of the present invention which discloses mirrors 42-44 and 50-52 mounted upon the attachment 49. An indentation 59 is also generally shown where the warning light 10 is preferably positioned.

The first mirrors 42, 50 are preferably manufactured from a 0.025" sheet of ALZAK ® aluminum. In contrast, the second 43, 51 and third 44, 52 mirrors are preferably vacuum metalized onto the appropriate sections of the vertical surface 57 of the attachment 49.

As the previous description suggests, several advantages are associated with the moving of the first mirrors 42, 50 forward in the attachment 49 such that two ports 45, 58 are defined between the first 42, 44 and third 52, 50 mirrors of the mirror assembly. One such advantage is the increased effectiveness of the warning light-mirror assembly combination over prior art devices. Seven individual, distinct flashes are now available, making the present inventive mirror assembly, as well as the warning light-mirror assembly combination, more eye-catching to an observer. A further advance is the compactness of the present combination. Utilizing the present design, seven flashes may be obtained from a combination which is similar in size to prior art combinations.

Returning momentarily to the concept of obtaining multi-colored flashes from a warning light by the use of multi-colored filters, it is also contemplated that a colored filter may be placed over at least a portion of the warning light illustrated in FIG. 3a. If such a filter is placed on the forward portion of a warning light dome which is transparent, reflected beams 47 and 54 would be colored, while beams 46, 48, 53 and 55 would remain uncolored. By arranging colored filters upon portions of the dome as described previously, multi-colored flashes may be obtained, this further enhancing the effectiveness of the present warning light-mirror assembly combination.

Figure 4A:
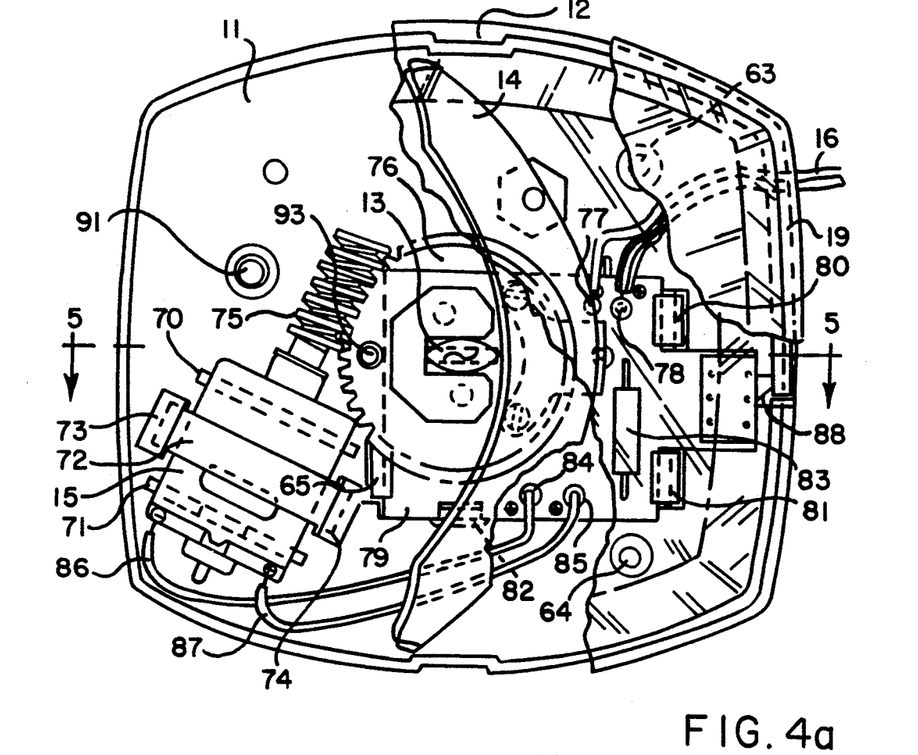
FIG. 4a is a top view of the interior of a preferred embodiment of the present warning light which is configured for rotating the reflector 360° about a focal point of the reflector.

Turning now to the warning light itself, FIG. 4a is a top sectional view of the preferred warning light which is configured so as to rotate the reflector 14 of FIG. 1 360°. The light consists of a base 11 and a dome 12 which are attached to one another, advantageously by a snap-fit, tongue and slot system. A filter 18 may optionally be secured over at least a portion of the dome such that colored light may be produced upon operation of the light. All of these components are preferably produced from available plastic materials.

The aforesaid base 11 and dome 12 house the various mechanical and electric components which allow the light to operate.

With respect to the mechanical components which affect the operation of the warning light, a means for driving the rotation of the reflector 14 is provided. This means advantageously comprises a electric motor 15 which is secured onto the base 11. The motor is preferably a conventional 12 volt D.C. permanent magnet type which is well known in the art. The motor 15 is supported by two U-shaped cradles 70, 71 which are preferably molded into the base 11. The motor 15 is secured onto the cradles 70, 71 and hence to the base 11 by a U-shaped clip 72. The ends of this clip 72 engage slots in each of two motor mounts 73, 74. These slots are configured so as to allow the motor to be secured in position by a snap-fit type assembly technique. Such snap-fit assembly is an efficient method of securing the motor 15, this being opposed to prior art methods which utilized screws and other labor-intensive fastening devices.

A worm 75 is journaled onto the drive shaft of the motor 15. This worm 75, which is advantageously produced using a plastic material, is sized so as to enable it to mechanically engage a gear 76 such that, upon rotation of the worm 75, the gear 76 will rotate 360°. As the reflector 14 is mounted onto this gear 76, it rotates in accordance with the gear 76. It is this rotation of the reflector 14 that causes light from the lamp 13 to be reflected outwardly from the warning light 10 and rotated 360°.

In order to effect such rotation of the reflector 14, gear 76 and worm 75, various other components are required. It will be appreciated from FIG. 4a that the current which enables the warning light 10 to operate enters the light 10 by means of the power cable 16. Upon entering the housing of the light 10, the cable 16 is split into its negative and positive wire components and positioned into place onto two barrel terminals 77, 78. These barrel terminals 77, 78 are advantageously used as the insulation does not need to be stripped off the wires prior to contacting the terminals 77, 78, as was the case in prior art assemblies. As these type of barrel terminals are used in this as well as another area of the light 10, cost savings in the form of a reduction in labor costs are realized. Such barrel terminals are well known in the art. Examples of these terminals include "Insulation Displacement Terminals" available from AMP, Inc.

The barrel terminals 77, 78 are mounted onto a printed circuit board 79 by conventional means. Although any conventional circuit board material can be used, a circuit board which is capable of withstanding high temperatures is preferred, e.g., an FR5 glass-filled epoxy board. This circuit board 79 is in turn mounted onto the base 11 by use of a snap-fit assembly. This assembly comprises a series of stationary clips, exemplified by 65, 80 and 81, and movable clips, exemplified by 82, each type of clip being molded into the base 11. These clips are designed such that the printed circuit board 79 can be initially slid under clips 80 and 81. Subsequently, the board 79 may be pushed downwardly and slid under clip 65 and a second clip, this second clip being hidden by gear 76. The clips 80 and 81 are long enough so that they continue to engage the circuit board 79 after the board is slid under clip 65 and the hidden second clip. As the circuit board 79 is slid into position, an upper portion of the movable clip 82 as well as a second movable clip, which is also hidden by the gear 76, snap over the board 79 and secure the board 79 into place.

Figures 6A, 6B:
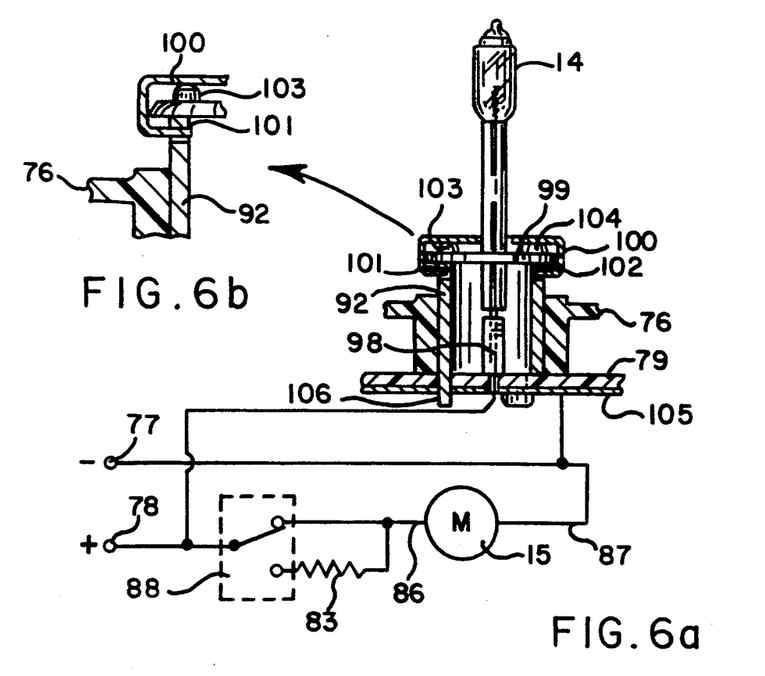
FIG. 6a includes a schematic of a warning light circuit which provides for the rotation of the reflector to be switched between two speeds, this figure further illustrating the connection of the circuit with the lamp, lamp flange and clip.
FIG. 6b is an enlargement of a portion of FIG. 6a which illustrates, in detail, the engagement of the assembly, lamp flange, and skirt by the clip.

The circuit board 79 itself has a ground plane circuit printed thereon, this circuit being more fully described with regard to the schematic of FIG. 6a. For present purposes, it suffices to state that the circuit board 79 further comprises a resistor 83 and two additional barrel terminals 84, 85 which supply power to the motor 15 via two supply wires 86, 87. The motor 15 is wired such that, upon operation, the shaft of the motor rotates in one direction.

The warning light 10 further comprises a manually operable mechanism 88 which is mounted to the base 11. This mechanism 88 is accessible by the operator and is used to control the rate of speed of the motor 15 which, in turn, controls the rate of rotation of the reflector 14. Such mechanism 88 preferably has variable positions which allow the speed of the motor 15 to be variably adjusted, although the embodiment illustrated in FIG. 4a shows the mechanism 88 as a two-position switch.

Figure 4B:
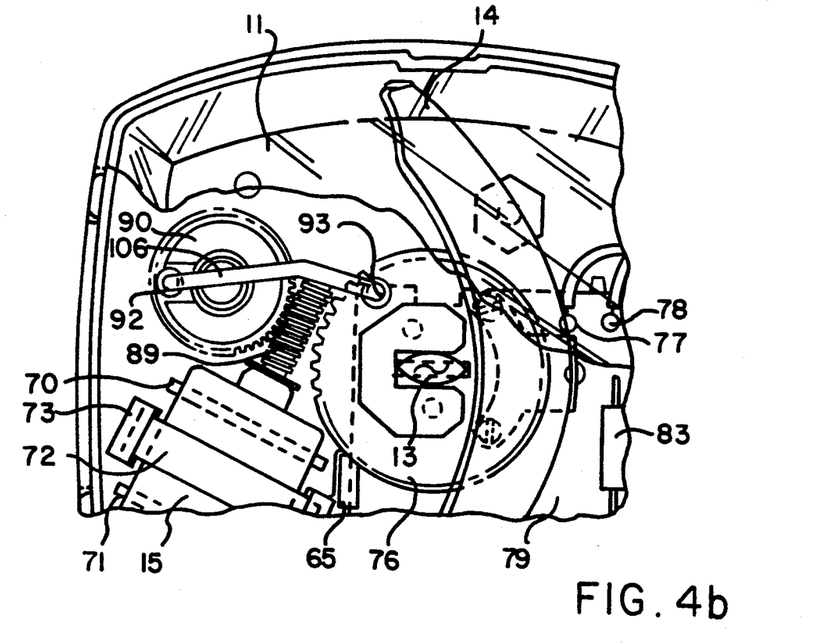
FIG. 4b is a top view of the interior of a preferred embodiment of the present warning light which is configured for rotating the reflector in an oscillating manner about a focal point of the reflector.

FIG. 4b provides a top view of an alternative embodiment of the warning light of FIG. 1. In this embodiment, the reflector 14 is able to be rotated in an oscillating manner as opposed to 360°. To achieve such oscillation of the reflector 14, only two modifications of the embodiment illustrated in FIG. 4a need be completed.

The first modification is a substitution of the relatively large worm 75 for a smaller worm 89. Further, a worm wheel 90 is journaled onto a boss 91 (the boss being illustrated in FIG. 4a) which boss 91 is molded into the base 11. The worm wheel 90 is advantageously produced from a plastic material. The result is that the worm wheel 90 and the worm 89 are mechanically engaged. The use of a smaller diameter worm also serves to prevent engagement of the worm 89 with the gear 76, this non-engagement being significant to provide oscillating motion to the reflector 14. The worm wheel 90 also includes a means for connecting the worm wheel 90 to the gear 76 which is capable of translating the continuous movement of the worm wheel 90 to the gear 76. Advantageously, the connecting means comprises a rod 106 which is configured so as to be received by journals 92, 93 located along the radii of both the worm wheel 90 and the gear 76.

Upon operation, the previously described apparatus allows motion to be translated from the motor 15 to the gear 76 in the following manner. As the drive shaft of the motor 15 turns, so does the worm 89. As the worm 89 rotates, the worm wheel 90 also rotates fully about its axis. This rotational movement allows the rod 106 to translate this movement to the gear 76 which gear 76 oscillates about its axis of rotation. Such oscillation of the gear 76 also causes the reflector 14 to oscillate as the reflector 14 is mounted onto the upper face of the gear 76.

Figure 5:
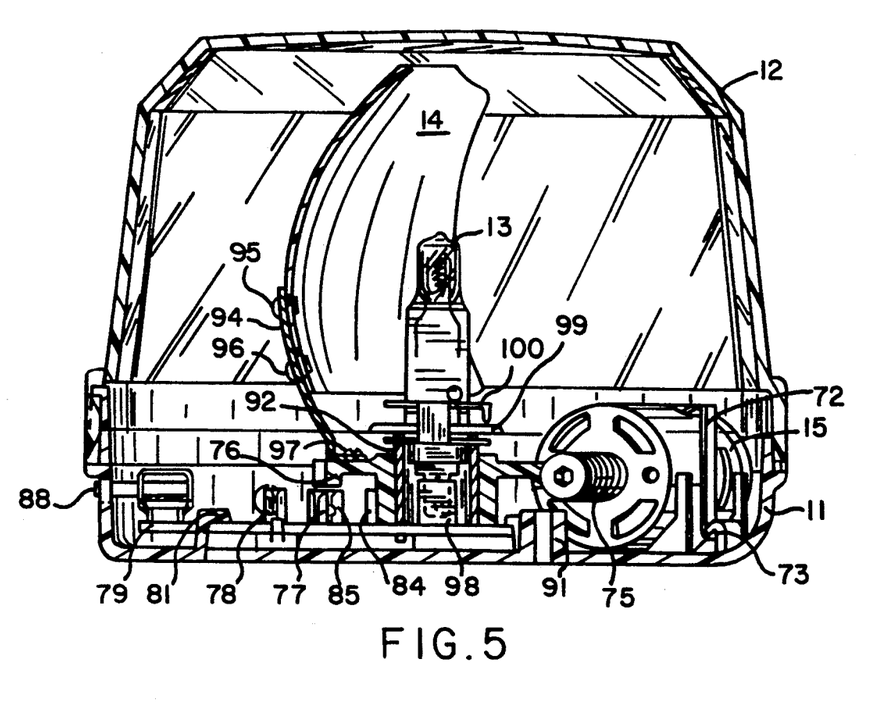
FIG. 5 is a sectional view taken along line 5—5 of FIG. 4a which illustrates the interior assembly of a preferred warning light of the present invention.

In order to more fully describe the particular components of the warning light 10, reference is now made to FIG. 5 which is a cross-sectional view of FIG. 4a. FIG. 5 is more clearly illustrative of what may be generally characterized as the lamp-reflector assembly. As will be appreciated from FIG. 5, and more particularly FIG. 6a, a skirt 92 is secured onto the printed circuit board 79. This skirt 92 is generally cylindrically-shaped and is produced from a conductive material, preferably diecast zinc which has been nickel plated. Such material is significant to the proper functioning of the warning light 10. As will be described subsequently, the skirt 92 acts to electrically connect the lamp 13 to the ground plane of the circuit board.

Advantageously, the skirt 92 is secured onto the circuit board 79 prior to assembly of the warning light 10, preferably via wave soldering. Upon assembly, the entire circuit board 79 and skirt 92 combination may be simply snap-fit into place. The eliminating of time-consuming soldering operations at the point of assembly is yet another example of the cost advantages associated with the design of the present invention. Further, an assembly line worker need not be trained in soldering techniques, nor exposed to potentially hazardous heating elements to successfully assemble a warning light of the present invention.

The gear 76 itself advantageously comprises a plastic. Preferably, the plastic is a combination of nylon 6/6, 15 wt. % polytetrafluoroethylene, and 15 wt. % carbon. As the gear 76 is journaled directly onto the skirt 92, such material serves to allow the gear 76 to freely rotate about its axis. Without use of such material, the gear 76 could potentially bind with the skirt 92. Use of such materials, however, eliminates any concern in this regard.

As mentioned previously, the reflector 14 is mounted onto the gear 76. This mounting utilizes a bracket 94 which is secured to both the reflector 14 and the gear 76 by any suitable fastening means. In the preferred embodiment, pop rivets 95, 96 are used to secure the reflector 14 to the bracket 94. Screws 97 may be used to secure the bracket 94 to the gear 76. This entire reflector-bracket-gear combination is preferably assembled prior to the assembly of the warning light 10 itself, thus reducing the number of parts necessary to assemble a warning light.

The reflector is preferably comprised of 3003 aluminum which has been formed into a parabolic configuration. After formation, the reflector blank is polished, "bright-dipped", and anodized as is known in the art to produce the finished reflector.

Also electrically connected to the circuit board 79 by soldering, but to a positive terminal of same, is a lamp socket 98 into which the lamp 13 is inserted. The socket 98 may be of any conventional construction so long as it allows the lamp 13 to be easily replaced. As in the case of the skirt 92, the socket 98 is preferably soldered into place on the circuit board 79 at a time prior to the assembly of the warning light 10.

The lamp 13 itself comprises a bulb which is positively electrically connected to the lamp socket 98 and negatively to a flange 99 which extends laterally with respect to the longitudinal axis of the lamp 13. Such a lamp is typically described as a 55 watt type H-1 halogen lamp. An example of such lamp is available from Philips, Inc. One function of the flange 99 is to provide a negative terminal for the lamp 13. The flange 99 is located along the longitudinal axis of the lamp 13. In view of this, the skirt 92 should be constructed such that when the lamp 13 is fully engaged within the socket 98, the flange contacts the skirt 92, thereby providing a ground contact for the lamp 13. In order to ensure the maintenance of the ground contact between the lamp flange 99 and the skirt 92, a clip 100 is provided. This clip should be produced from a conductive material, preferably 0.030" cold rolled steel which has been nickel plated. This clip 100 engages two diametrically opposed slots 101, 102 on the skirt 92 and two protrusions 103, 104 of the flange. Thus, the flange 99 also provides a means by which the lamp 13 may be securely held in place during operation of the light 10. In accordance with the design concept of the present invention, this clip provides another snap-fit assembly in the overall warning light assembly process.

Turning to FIG. 6a, an enlargement of the lamp assembly is illustrated in greater detail. In particular, the electrical connection of the skirt 92 with the ground plane 105 of the circuit board 79 shown. Such connection is made by the soldering of a tab 106 of the skirt 92, which tab 106 extends through the circuit board 79, onto the ground plant 105.

As will be appreciated from FIG. 6b which is a detailed cross-sectional view of a portion of FIG. 6a, the interaction between a flange protrusion 103, a slot 101 of the skirt 92, and the clip 100 is illustrated in detail.

Returning finally to FIG. 6a, there is provided a schematic of the circuitry used in conjunction with the warning light 10 of the present invention. In particular, current flows through the positive barrel terminal 78 and is split such that the lamp 13 receives a constant voltage at all times. The circuit path to the motor, however, includes, as exemplified herein, the two-position switch 88 (also seen in FIG. 4a) which can be used to divert the current such that the current either passes through the resistor 83 or is shunted around it. If the current passes through the resistor, the motor 15 correspondingly operates at a relatively slow rate because it receives less power. This results in a relatively slow rotation of the reflector 14. If the switch 88 is positioned such that the current bypasses the resistor, the motor 15 will operate at a relatively faster rate. This, accordingly, results in a relatively faster operation of the reflector 14.

Although FIG. 6a discloses the use of a two-position switch and a fixed value resistor 83, the use of a variable resistor is also contemplated. In such a case, a variable means for controlling the resistor would be installed in the base 11 of the warning light 10. Such means would allow an operator to continuously vary the speed of the motor 15 and, accordingly, the rate of rotation of the reflector 14

What we claim is:

1. A mirror assembly for use with a warning light contained in a domed housing and having a reflector rotatable about a focal point of the reflector for rotating a beam of light emanating from a lamp at the focal point, the assembly comprising:
   an attachment for mounting to the domed housing, including a surface for intercepting the beam of light over a portion of a full rotation;
   a first set of first, second and third mirrors mounted to the attachment for reflecting the intercepted light in a predetermined direction, where each of the mirrors is positioned to reflect light at a different angle in the rotation of the beam such that the reflections occur first from the first mirror, then from the second mirror and finally from the third mirror; and
   a port between the first and third mirrors for passing light to the second mirror such that the reflected beam from the second mirror is further from the focal point than the reflected beams from the first and third mirrors.

2. A mirror assembly as set forth in claim 1 wherein the first set of mirrors is mounted on one side of a plane passing through the focal point and the assembly includes a second set of mirrors mounted to the attachment on another side of the plane for reflecting the intercepted light in a direction which is parallel to the plane.

3. A mirror assembly as set forth in claim 2 wherein each of the mirrors in the second set is positioned to reflect light at a different angle in the rotation of the beam such that after the light is reflected sequentially by the first, second and third mirrors of the first set of mirrors subsequent reflections from the second set of mirrors occur first from the third mirror, then from the second mirror and finally from the first mirror, the assembly further comprising a second port between the first and third mirrors of the second set of mirrors such that the reflected beam from the second mirror of the second set of mirrors is further from the focal point than the reflected beams from the first and third mirrors of the second set of mirrors.

4. A mirror assembly as set forth in claim 3 wherein the attachment has a vertical surface for supporting the second and third mirrors and the first mirrors are mounted forward of the vertical surface such that an opening between the first and third mirrors of each mirror set defines said port.

5. A warning light assembly comprising:
   a domed housing, a reflector and a lamp, the reflector and lamp being located within the housing such that the reflector is rotatable about a focal point of the reflector for rotating a beam of light emanating from the lamp located at the focal point,
   an attachment for mounting to the domed housing, including a surface for intercepting the beam of light over a portion of a full rotation;
   a set of first, second and third mirrors mounted to the attachment for reflecting the intercepted light in a predetermined direction, where each of the mirrors is positioned to reflect light at a different angle in the rotation of the beam such that the reflections occur first from the first mirror, then from the second mirror and finally from the third mirror; and
   a port between the first and third mirrors for passing light to the second mirror such that the reflected beam from the second mirror is further from the focal point than the reflected beams from the first and third mirrors.

6. A warning light assembly as set forth in claim 5, the domed housing comprising a base and an at least partially transparent dome which are attached to one another using a tongue and slot assembly.

7. A warning light assembly as set forth in claim 6, wherein the dome is a colored filter.

8. A warning light assembly as set forth in claim 7, further comprising a second colored filter which is snap-fit over a portion of the dome using a tongue and slot assembly.

9. A warning light assembly as set forth in claim 6, further comprising at least one colored filter which is snap-fit over the dome using a tongue and slot assembly.

10. A warning light assembly as set forth in claim 9, wherein upon operation of the lamp the second and third mirrors reflect light which passes through the first colored filter and the first mirrors reflect light which passes through the second colored filter.

11. A warning light assembly as set forth in claim 5, the housing comprising a base section including a magnet for mounting the warning light assembly to a metallic surface and a dome attached to the base section for transmitting the beam of light formed by the reflection from light emanating from the lamp, the reflector and lamp being mounted in the base section, the assembly further comprising a manually operable mechanism mounted to the base section and having variable positions and means responsive to the mechanism for rotating the reflector at different speeds when the mechanism is in different positions.

12. A mirror assembly as set forth in claim 11, wherein the manually operable mechanism for rotating the reflector at different speeds is a two-position switch.

13. A warning light assembly as set forth in claim 5, further comprising:
   a motor mounted in the base section for continuous rotation in a single direction and directly driving a worm gear comprising a worm and worm wheel so as to impart the continuous rotation to the worm wheel in a single direction, and
   means connecting the worm wheel to a gear that supports the reflector for translating the continuous rotation of the worm wheel to an oscillating movement for the gear and the reflector.

14. A transportable warning light as set forth in claim 13 wherein a diameter of the worm wheel is much smaller than a diameter of the gear and the means connecting the worm wheel to the gear is a rod received by journals at radii on both the worm wheel and the gear.

15. A transportable warning light as set forth in claim 13, wherein the worm and the gear are relatively positioned such that removal of the worm wheel and replacement of the worm by a larger diameter worm allows the larger diameter worm to directly drive the gear, thereby transforming the motion of the reflector from an oscillating movement to a continuous rotation.

16. A warning light assembly as set forth in claim 5, the housing comprising a base section and a dome attached over the base section, the assembly further comprising a printed circuit board mounted in the base section and having a ground plane printed circuit, a mounting for the lamp, and a clip, the reflector being mounted on the circuit board, the lamp including a flange extending laterally with respect to the longitudinal axis of the lamp which provides a ground contact for the lamp, the mounting for the lamp being secured to the circuit board and comprising a lamp socket and a conductive skirt around the socket, the skirt being in direct contact with the ground plane, and the clip creating and maintaining a biased engagement between the flange of the lamp and the skirt.

17. A transportable warning light having an oscillating beam comprising in combination:

a base section including means for securing the warning light to a surface;

a reflector mounted in the base section to a gear for rotation about a axis containing a focal point of the reflector;

a lamp mounted in the base section and at the focal point;

a motor mounted in the base section for continuous rotation in a single direction and directly driving a warm gear comprising a worm and worm wheel so as to impart the continuous rotation to the worm wheel in a single direction; and means connecting the worm wheel to the gear supporting the reflector for translating the continuous rotation of the worm wheel to an oscillating movement for the gear and the reflector.

18. A transportable warning light as set forth in claim 17, wherein a diameter of the worm wheel is much smaller than a diameter of the gear and the means connecting the worm wheel to the gear is a rod received by journals at radii on both the worm wheel and the gear.

19. A transportable warning light as set forth in claim 17, wherein a worm and the gear are relatively positioned such that removal of the worm wheel and replacement of the worm by a larger diameter worm allows the larger diameter worm to directly drive the gear, thereby transforming the motion of the reflector from an oscillating movement to a continuous rotation.

20. A transportable warning light as set forth in claim 17, wherein the means for securing the warning light to the surface is a magnet.

21. A transportable warning light providing a moving beam of light, the warning light comprising in combination:

a base section including means for securing the warning light to a surface;

a dome fitted over the base section;

a printed circuit board mounted in the base section and having a ground plane printed circuit;

a reflector mounted on the circuit board for rotation about an axis containing a focal point of the reflector;

a lamp positioned at the focal point including a flange extending laterally with respect to a longitudinal axis of the lamp and providing a ground contact for the lamp;

a mounting for the lamp secured to the circuit board and including a lamp socket and a conductive skirt around the socket, the skirt being in direct contact with the ground plane; and a clip for creating and maintaining a biased engagement between the flange of the lamp and the skirt.

22. A transportable warning light as set forth in claim 21, wherein the conductive skirt is a bearing surface for the rotation of the reflector.

23. A transportable warning light as set forth in claim 21, wherein the conductive skirt is cylindrically shaped and includes two diametrically opposing slots in the wall of the cylinder for receiving a portion of the clip.

24. An apparatus secured to a vehicle for providing to an observer of the vehicle a flashing visual warning signal such that the effectiveness of the warning signal for drawing the attention of the observer is optimized for the application of the vehicle and its environment, the apparatus comprising a base for mounting to a surface of the vehicle, an assembly supported by the base and including a reflector rotatable about a vertical axis and a lamp located substantially at the vertical axis, a motor supported by the base and coupled to the assembly by way of a gear mechanism for driving the reflector about the vertical axis in order to create the flashing visual warning signal, a cable for communicating a source of power to the motor and the lamp, a transparent dome fitted over the assembly and the motor and mated to the base, a switch interfacing the cable to the motor having at least two discrete outputs and an input and means for alternatively connecting one of the outputs to the input, wherein each of the outputs provides a different flash rate for the flashing visual warning signal by applying a voltage to the motor whose value is different from the value of the voltage provided by all other outputs, and at least one of the outputs of the switch including a resistor between and in series connection with the input of the switch and the motor, where the resistor has a value that is selected to provide a predetermined flash rate, which is optimized for the application and the environment of the vehicle.

25. An apparatus as set forth in claim 24 wherein the base and the dome form a housing having an opening for receiving a manually operable portion of the switch for selecting one of the flash rates associated with the outputs of the switch, the assembly including a circuit board mounted to the base and supporting the switch in a fixed relationship to the housing and electrically communicating the switch with the motor and the cable.

26. An apparatus as set forth in claim 24 wherein the base and dome form a housing having an opening for receiving a manually operable portion of the switch for selecting one of the flash rates associated with the outputs of the switch, a reflector for mounting external to the housing and including an opening that substantially aligns with the opening of the housing for providing access to the manually operable portion of the switch when the external reflector is mounted to the housing.

* * * * *